Oct. 21, 1924.

J. S. ANDRESS, JR 1,512,737

PLOW ATTACHMENT FOR TRACTORS

Filed May 16, 1923

2 Sheets-Sheet 1

J. S. Andress, Jr.
INVENTOR

BY Victor J. Evans
ATTORNEY

WITNESS:

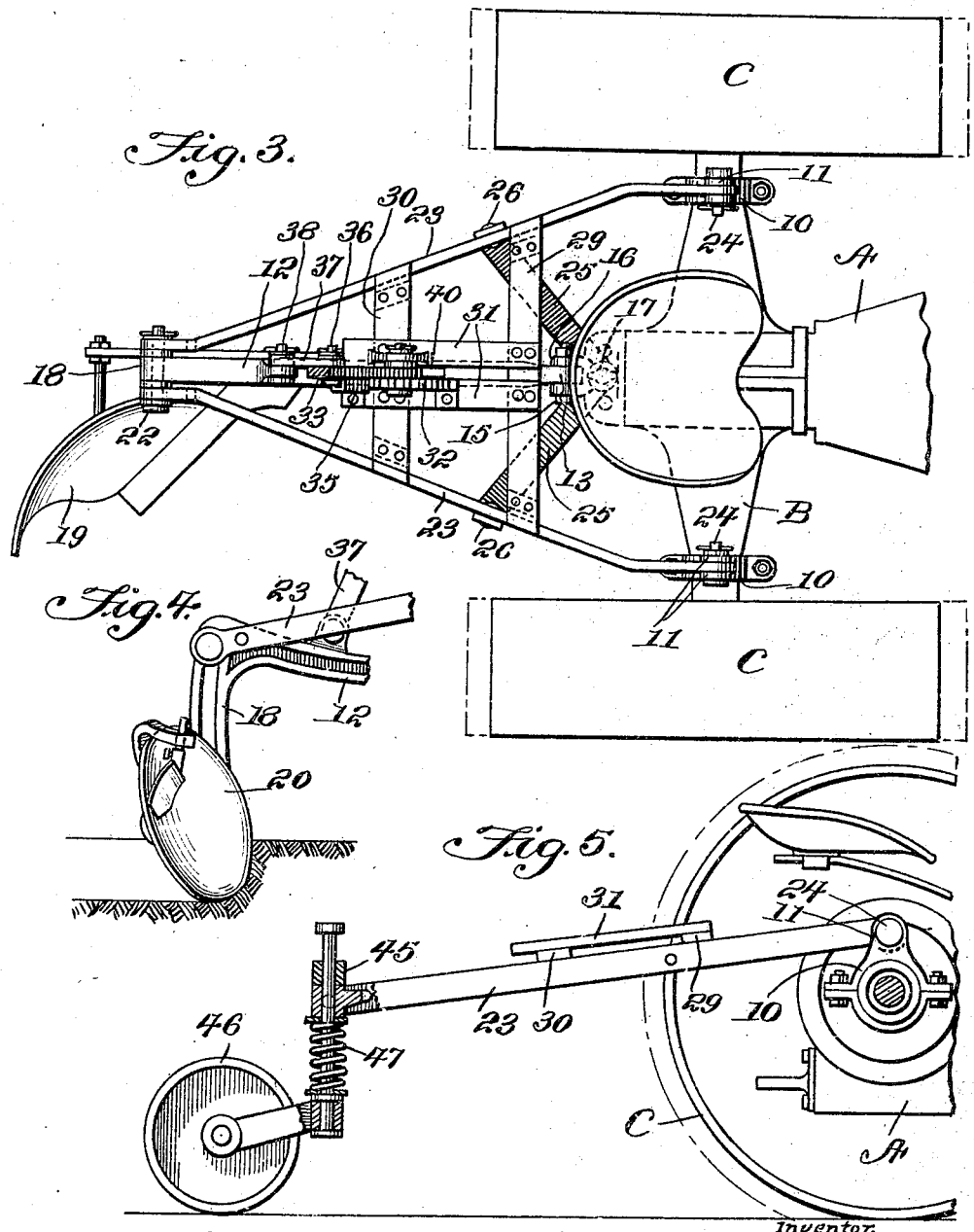

Patented Oct. 21, 1924.

1,512,737

UNITED STATES PATENT OFFICE.

JOHN S. ANDRESS, JR., OF PALMETTO, FLORIDA.

PLOW ATTACHMENT FOR TRACTORS.

Application filed May 16, 1922. Serial No. 639,434.

*To all whom it may concern:*

Be it known that I, JOHN S. ANDRESS, Jr., a citizen of the United States, residing at Palmetto, in the county of Manatee and State of Florida, have invented new and useful Improvements in Plow Attachments for Tractors, of which the following is a specification.

This invention relates to agricultural implements particularly to plows, and has for its object the provision of a novel plow designed to be mounted directly upon the rear axle housing of a tractor and equipped with means whereby the plow proper may be lifted into inoperative position while the device is being moved idly from place to place, this same lifting means also serving to limit the degree of penetration of the plow share or disk, as the case may be, depending upon the nature of the soil and the desired depth of treatment.

Another object is the provision of a plow structure of this character which, when in operative position, will also serve to prevent rearing back of the tractor as so frequently occurs when a pull is unusually heavy.

An additional object is the provision of a structure of this character which will be simple and inexpensive in manufacture, highly efficient in use, durable in service and a general improvement in the art.

Figure 1:
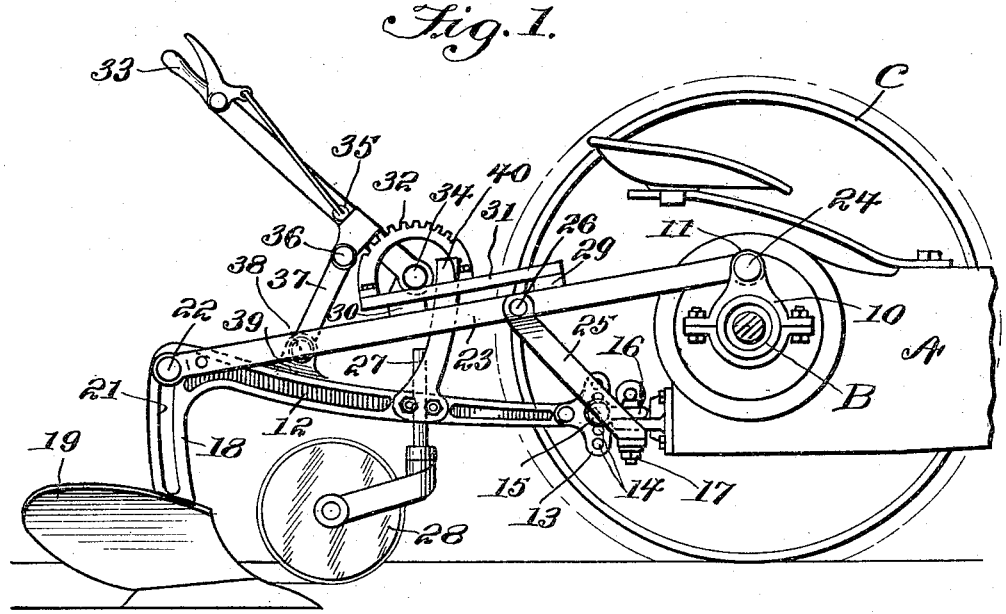
Figure 2:
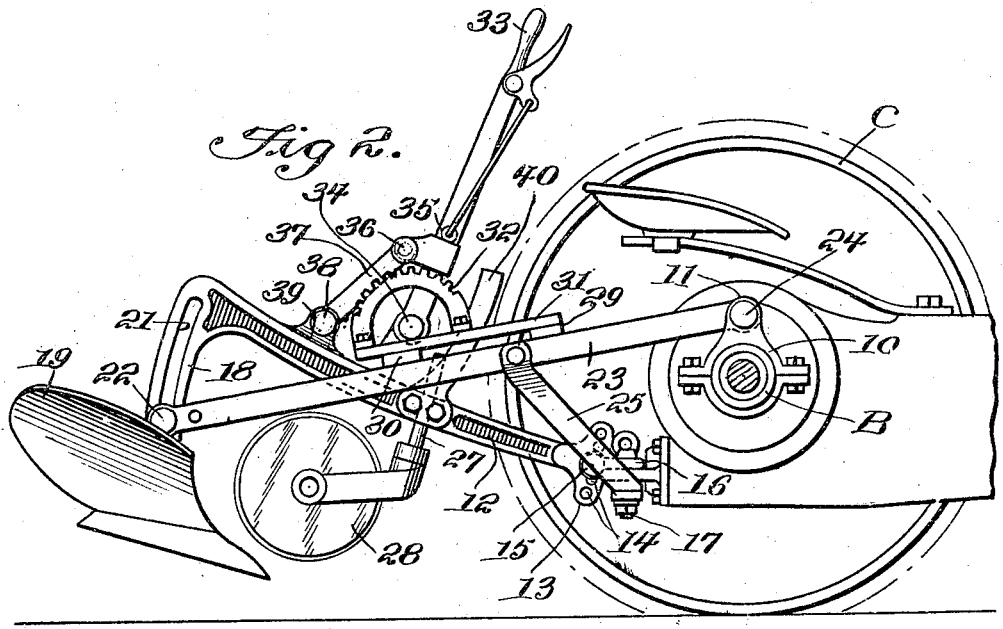

With the above and other objects and advantages in view the invention consists in the details of construction to be hereinafter more fully described and claimed and illustrated in the accompanying drawings, in which:

Figure 1 is a side elevation of my device showing it mounted upon a tractor, the forward wheel of the tractor being removed so as not to obscure view of the parts, this view showing the plow in its operative position, Figure 2 is a similar view showing the plow lifted into inoperative position, Figure 3 is a plan view, Figure 4 is a detail view showing the standard as equipped with a disk instead of the usual share, The remaining figures are detail views showing the device used for other purposes than in association with a plow.

Referring more particularly to the drawings the letter A designates a portion of a tractor including the rear axle housing B and rear wheels C. In carrying out my invention I provide a pair of collars 10 which are of the split type and which are clamped upon the rear axle housing B near the ends thereof and which are formed with attaching ears 11. I also provide an elongated plow beam 12 which has its forward end formed with a vertically elongated head 13 provided with a series of holes 14 through any one of which may be passed a bolt 15 carried by a clevis 16 which is bolted at 17 onto the draw bar of the tractor. The provision of the holes 14 enables variations to be made in the mounting of the beam. The rear end of this beam terminates in a depending standard 18 upon which is detachably mounted the plow proper 19 or the disk 20 shown in one of the detail figures. This depending standard is formed with a slot through which passes a bolt 22 which passes through the rear ends of forwardly diverging arms 23 which are pivotally connected at 24 with the ears 11 on the collars 10.

Connected with the draw bar are braces 25 which diverge upwardly and which are connected with the arms 23 as shown at 26.

Clamped upon the forward portion of the beam 12 is a vertically adjustable standard 27 which has its lower end carrying a guide roller or disk 28 which travels in advance of the plow and which may serve as a depth gage. The position of this roller may be varied up or down as desired by loosening the clamp and shifting the position.

Extending across and secured to both of the arms 23 is a cross bar 29 which is located comparatively near the tractor axle and located nearer the outer end of the device is a similar cross bar 30. Secured to both of these cross bars is a longitudinally extending bar 31 upon which is mounted a notched segment 32 with which co-operates a hand lever 33 pivoted at 34 and provided with a grip released latch 35 co-operating with the segment 32. Pivotally connected at 36 with the lever is a link 37 which extends rearwardly and which is pivotally connected at 38 with an upstanding horn 39 on the beam 12. Secured to the forward portion of the beam is an arm 40 which has its upper end secured to the bar 31 to reinforce the structure.

In the normal position of the parts, the plow blade or disk as the case may be projects down into the ground and accomplishes plowing in the ordinary manner. In this operative position the lever 33 is in or near its rearmost adjusted position and the bolt 22 is at the upper end of the slot 21. When the plowing has been accomplished and it is desired to move the device idly from one place to another, the operator grasps the lever 33, releases the latch 35 and pushes forwardly, whereupon the link 37 pulling upon the horn 38 will swing the beam 12 upwardly upon the bolt 15 as a pivot, this movement being permitted owing to the fact that the slot 21 accommodates the bolt 22. The latch 35 will lock the parts in this elevated position. It will be seen that the arms 23, braces 25, bars 29 and 30, bar 31 and arm 40 constitute the stationary frame of the device which is rigidly secured upon the tractor but which may be easily removed when such is desired. The only part that moves is the beam 12 and the link and lever mechanism connected therewith and of course the plow carried thereby. When the device is in operation it is apparent that the plow serves to prevent rearing of the tractor in an obvious manner so that there is no danger of injury to the operator.

From the foregoing description and a study of the drawings it will be apparent that I have thus provided a simply constructed, inexpensive and easily installed plow attachment for tractors which is mounted so close to the tractor as to be able to make very short turns therewith. All the parts of the device are easily adjustable so as to do the character of plowing desired and to meet various conditions. The anticreeping feature is of great importance and the lifting of the plow into inoperative position is likewise a great convenience as will be apparent to one skilled in the art.

In certain of the figures of the drawings I have shown the device as used in a capacity other than in connection with a plow. The structure can be used as a carrier for carrying spray tanks for spraying groves, orchards or the like by adding a wheel at the rear end of the frame to replace the plow structure. In such an instance the plow structure is replaced by a standard 45 which carries a wheel 46, and this standard is rotatably mounted or swiveled at the back of the frame so as to act as a species of castor wheel. I also provide a spring 47 which acts to cushion the device and permit proper travel over uneven ground. Other adaptations will of course suggest themselves without further elaboration.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A plow attachment for tractors comprising a relatively stationary frame provided with means for connection upon the rear axle housing and draw bar of a tractor, a plow beam pivotally mounted on said frame and carrying a ground engaging element, and means for swinging said beam to vary the position of the ground engaging element, said frame consisting of forwardly diverging bars connected by cross bars, a clevis carried by the forward end of the beam and detachably connected with the draw bar of the tractor, a brace connected with said clevis and with the cross bars of the frame, and clamping collars connected with the forward ends of the first named bars and embracing the axle housing of the tractor.

2. A plow attachment for tractors comprising a stationary frame including forwardly diverging bars connected at their rear ends and having their forward ends carrying collars engaging upon the rear axle housing of a tractor, cross bars secured to and connecting said bars, a clevis detachably connected with the draw bar of the tractor, braces connected with said draw bar and with said first named bars, a beam pivotally and adjustably connected with the clevis and slidably mounted with respect to the first named arms, a ground engaging element carried by the beam, and a lever mechanism mounted on the stationary frame for moving said beam vertically.

3. A plow attachment for tractors comprising a stationary frame including forwardly diverging bars connected at their rear ends and having their forward ends carrying collars engaging upon the rear axle housing of a tractor, cross bars secured to and connecting said bars, a clevis detachably connected with the draw bar of the tractor, braces connected with said draw bar and with said first named bars, a beam pivotally and adjustably connected with the clevis and slidably mounted with respect to the first named arms, a ground engaging element carried by the beam, and a lever mechanism mounted on the stationary frame for moving said beam vertically, consisting of a horn on the rear extremity of the beam, a notched segment carried on the stationary frame, a lever pivotally mounted and carrying a grip released latch cooperating with the segment and a link connected with said lever and with said horn.

4. A plow attachment for tractors comprising a stationary frame including forwardly diverging bars connected at their rear ends and having their forward ends carrying collars engaging upon the rear axle housing of a tractor, cross bars secured to and connecting said bars, a clevis detachably connected with the draw bar of the tractor, braces connected with said draw bar and with said first named bars, a beam pivotally and adjustably connected with the clevis and slidably mounted with respect to the first named arms, a ground engaging element carried by the beam, and a lever mechanism mounted on the stationary frame for moving said beam vertically, the rear ends of said first named bars being connected by a bolt, and said beam being formed with a slot for the passage of said bolt.

In testimony whereof I affix my signature.

JOHN S. ANDRESS, Jr.